United States Patent
Yao et al.

(10) Patent No.: US 6,934,127 B2
(45) Date of Patent: Aug. 23, 2005

(54) PRECISE POSITIONING ACTUATOR FOR HEAD ELEMENT, HEAD GIMBAL ASSEMBLY WITH THE ACTUATOR AND DISK DRIVE APPARATUS WITH THE HEAD GIMBAL ASSEMBLY

(75) Inventors: Ming Gao Yao, Kwai Chung (HK); Masashi Shiraishi, Kwai Chung (HK); Tamon Kasajima, Kwai Chung (HK)

(73) Assignee: Sae Magnetics (H.K.) Ltd., Kwai Chung (HK)

( * ) Notice: Subject to any disclaimer, the term of this patent is extended or adjusted under 35 U.S.C. 154(b) by 181 days.

(21) Appl. No.: 10/382,903

(22) Filed: Mar. 7, 2003

(65) Prior Publication Data

US 2004/0085679 A1 May 6, 2004

(30) Foreign Application Priority Data

Nov. 4, 2002 (CN) .............................. PCT/CN02/00781

(51) Int. Cl.$^7$ ................................................ G11B 5/56
(52) U.S. Cl. ................................................... 360/294.4
(58) Field of Search .......................... 360/294.4, 294.6

(56) References Cited

U.S. PATENT DOCUMENTS

| | | | |
|---|---|---|---|
| 5,745,319 A | 4/1998 | Takekado et al. | |
| 6,078,473 A | 6/2000 | Crane et al. | |
| 6,201,668 B1 | 3/2001 | Murphy | |
| 6,690,551 B2 * | 2/2004 | Shiraishi et al. | ......... 360/294.4 |
| 2002/0036870 A1 | 3/2002 | Shiraishi et al. | |
| 2002/0051326 A1 | 5/2002 | Shiraishi et al. | |
| 2002/0141117 A1 | 10/2002 | Kasajima et al. | |
| 2002/0154447 A1 | 10/2002 | Kasajima et al. | |
| 2002/0154450 A1 | 10/2002 | Kasajima et al. | |
| 2002/0176212 A1 | 11/2002 | Ota et al. | |

FOREIGN PATENT DOCUMENTS

| | | |
|---|---|---|
| JP | 8-180623 | 7/1996 |
| JP | 2002-74870 | 3/2002 |

\* cited by examiner

*Primary Examiner*—Robert S. Tupper
(74) *Attorney, Agent, or Firm*—Burns, Doane, Swecker & Mathis, L.L.P.

(57) ABSTRACT

A precise positioning actuator for precisely positioning at least one head element is provided with a base and a pair of movable arms capable of displacing in response to a drive signal applied to the actuator. The pair of movable arms extend from the base for catching a head slider with at least one head element in a space between the pair of movable arms. Each of the pair of movable arms includes an arm member made of an elastic sintered ceramic and having substantially the same cross sectional shape from a root thereof to a top end thereof, a piezoelectric element formed on a side surface of the arm member and a protrusion additionally formed on an inside surface of the arm member near its top end section. The protrusion has tapered surfaces. Side surfaces of the head slider are adhered to the inside surfaces of the arm members at the protrusions and within regions between the protrusions and top ends of the arm members.

30 Claims, 11 Drawing Sheets

PRECISE POSITIONING ACTUATOR FOR HEAD ELEMENT, HEAD GIMBAL ASSEMBLY WITH THE ACTUATOR AND DISK DRIVE APPARATUS WITH THE HEAD GIMBAL ASSEMBLY

FIELD OF THE INVENTION

The present invention relates to a precise positioning actuator for a head element such as a thin-film magnetic head element or an optical head element, to a head gimbal assembly (HGA), with the actuator and to a disk drive apparatus with the HGA.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623A.

A piggy-back structure actuator is one of these conventional precise positioning actuators. This piggy-back structure actuator is formed by piezoelectric material of PZT in an I-character shape with one end section to be fixed to a suspension, the other end section to be fixed to a magnetic head slider and a pillar shaped movable arm connected between these end sections. On the suspension, stepwise stacked are the actuator and the magnetic head slider, namely, the actuator is caught between the suspension and the slider to form a stacked cantilever structure.

However, an HGA with such piggy-back structure actuator will have following various problems:
(1) Because of the stepwise stacked structure, a total thickness of the HGA around the magnetic head slider increases by the thickness of the actuator;
(2) The actuator as a whole consists of piezoelectric material such as PZT of a brittle material, and the actuator and the magnetic head slider are stacked to form a cantilever structure. A shock easily occurs with a moment and also shock resistance is very poor;
(3) Depending upon the size of the magnetic head slider, a travel of the magnetic head element during the precise positioning operation varies. Thus, it is difficult to obtain enough stroke;
(4) Because of three-dimensional and complicated attachment structure of the actuator, the handling at the time of an assembly of the HGA is very difficult and it is impossible to use a conventional HGA assembly equipment causing productivity to be very worse; and
(5) In order not to interfere with the movement of the actuator, it is necessary to assemble with keeping a gap between the actuator and the magnetic head slider and also between the actuator and the suspension. However, forming of such gap will more decrease the shock resistance and it is difficult to precisely keep the gap constant. Particularly, since it is difficult to keep the suspension, the actuator and the magnetic head slider in parallel precisely, the head characteristics deteriorates.

In order to solve the aforementioned problems, inventors of this application have been proposed an actuator with a structure in which a head slider is caught in a space between a pair of movable arms capable of displacing in response to a drive signal applied thereto (Japanese patent publication 2002074870A, U.S. Pat. No. 6,690,551).

According to the actuator with such structure, the thickness of the HGA around the magnetic head slider does not increase even if the actuator is attached. Also, since the actuator and the magnetic head slider are not stacked to form a cantilever structure, a shock resistance can be improved. Furthermore, since the magnetic head slider is caught in between the pair of movable arms, it is possible to provide a constant travel to the slider even if the size of the magnetic head slider changes.

However, according to the actuator described in Japanese patent publication 2002074870A, since the slider fixing sections made of the same sintered ceramic were projected inwardly from the surfaces of the movable arms, stress due to applied shock concentrated to corners at the base of the projections causing these corners to be easily broken. Thus, it was very difficult to greatly improve the shock resistance of the actuator.

SUMMARY OF THE INVENTION

It is therefore an object of the present invention to provide a precise positioning actuator for a head element, an HGA with the actuator and a disk drive apparatus with the HGA, whereby a shock resistance can be greatly improved.

Another object of the present invention is to provide a precise positioning actuator for a head element, an HGA with the actuator and a disk drive apparatus with the HGA, whereby a stable and reliable adhesion with a head slider can be obtained.

Further object of the present invention is to provide a precise positioning actuator for a head element, an HGA with the actuator and a disk drive apparatus with the HGA, whereby stable stroke characteristics and stable resonance characteristics can be obtained.

According to the present invention, a precise positioning actuator for precisely positioning at least one head element is provided with a base and a pair of movable arms capable of displacing in response to a drive signal applied to the actuator. The pair of movable arms extend from the base for catching a head slider with at least one head element in a space between the pair of movable arms. Each of the pair of movable arms includes an arm member made of an elastic sintered ceramic and having substantially the same cross sectional shape from a root thereof to a top end thereof, a piezoelectric element formed on a side surface of the arm member and a protrusion additionally formed on an inside surface of the arm member near its top end section. The protrusion has tapered surfaces. Side surfaces of the head slider are adhered to the inside surfaces of the arm members at the protrusions and within regions between the protrusions and top ends of the arm members.

Also, according to the present invention, an HGA is provided with a head slider with at least one head element, a precise positioning actuator supporting the head slider for precisely positioning the at least one head element and a support fixed with the precise positioning actuator. The precise positioning actuator includes a base fixed to the support and a pair of movable arms capable of displacing in response to a drive signal applied to the actuator. The pair of movable arms extend from the base for catching the head slider in a space between the pair of movable arms. Each of the pair of movable arms includes an arm member being made of an elastic sintered ceramic and having substantially the same cross sectional shape from a root thereof to a top end thereof, a piezoelectric element formed on a side surface of the arm member and a protrusion additionally formed on an inside surface of the arm member near its top end section. The protrusion has tapered surfaces. Side surfaces of the head slider are adhered to the inside surfaces of the arm members at the protrusions and within regions between the protrusions and top ends of the arm members. Furthermore, according to the present invention, a disk drive apparatus has above-mentioned at least one HGA.

Since the actuator has the arm members of the movable arms shaped in flat with no level difference and the protrusions with the tapered surfaces, additionally formed on inside surfaces of the arm members near their top end sections, stress will not converge on specific portions of the arm members when an impactive force is applied to the HGA. Thus, shock resistance of the actuator and also of the HGA can be remarkably improved. Also, since side surfaces of the head slider are adhered to the inside surfaces of the arm members at the protrusions and within regions between the protrusions and top ends of the arm members, an adhering region and therefore the amount of the adhesive potted on the actuators can be uniformly controlled. Therefore, it is possible to obtain a stable and reliable adhesion force resulting an extremely stable stroke characteristics and an extremely stable resonance characteristics of the actuator.

Furthermore, since the actuator holds the side surfaces of the head slider so that the slider is caught in a space between the movable arms, the thickness of the HGA around the head slider does not increase even if the actuator is attached. Thus, no modifications in size of the disk drive apparatus due to the mounting of the actuator is necessary. Furthermore, since the actuator and the head slider are not stacked to form a cantilever structure, a shock resistance can be greatly improved. In addition, since the head slider is caught in between the movable arms, the top end sections of the movable arms, which actually transfer the displacement to the slider, can be always positioned at the top end of the slider. Thus, it is possible to provide a constant travel to the slider even if the size of the head slider changes, and therefore an enough stroke of the head at the precise positioning operation can be always obtained.

It is preferred that the base of the actuator is made of an elastic sintered ceramic, and that the protrusion of the actuator is made of a thick-film printing material. In this case, the thick-film printing material may be a metal material or a sintered ceramic material.

It is also preferred that the elastic sintered ceramic is zirconium oxide ($ZrO_2$).

It is preferred that the tapered surfaces of each protrusion of the actuator are located at front and back ends of the protrusion, respectively. The tapered surfaces of each protrusion may have flat surfaces or curved surfaces.

It is preferred that the actuator has a rough U-plane shape.

It is also preferred that the side surfaces of the head slider and the inside surfaces of the arm members are adhered with each other by a liquid adhesive or an adhesive film. If the adhesive film is used for adhering the head slider to the actuator, the adhesion process can be performed very easily and thus a required time for the adhesion process can be greatly shortened.

It is further preferred that the at least one head element is at least one thin-film magnetic head element or at least one optical head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
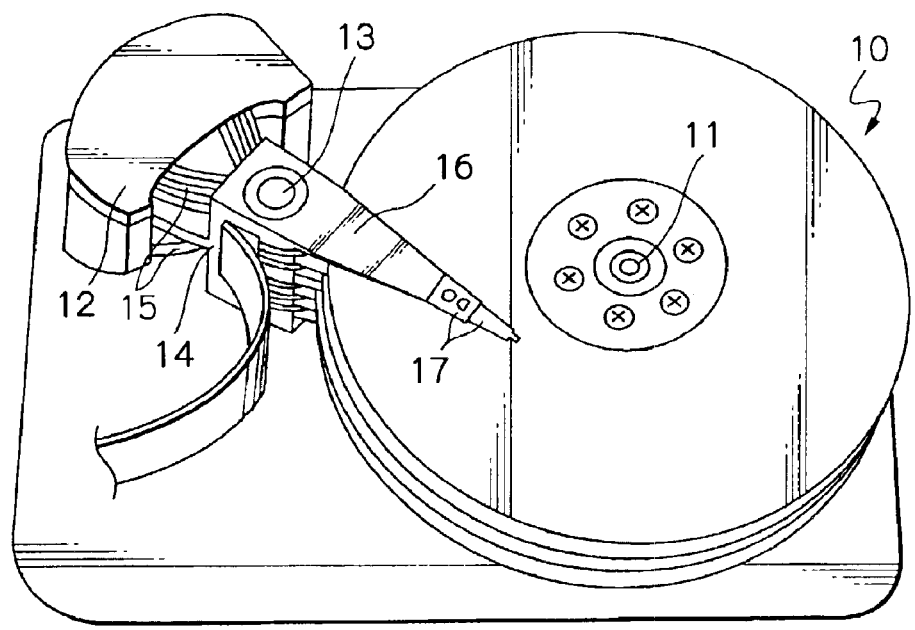
FIG. 1 is an oblique view schematically illustrating main components of a magnetic disk drive apparatus in a preferred embodiment according to the present invention.
Figure 2:
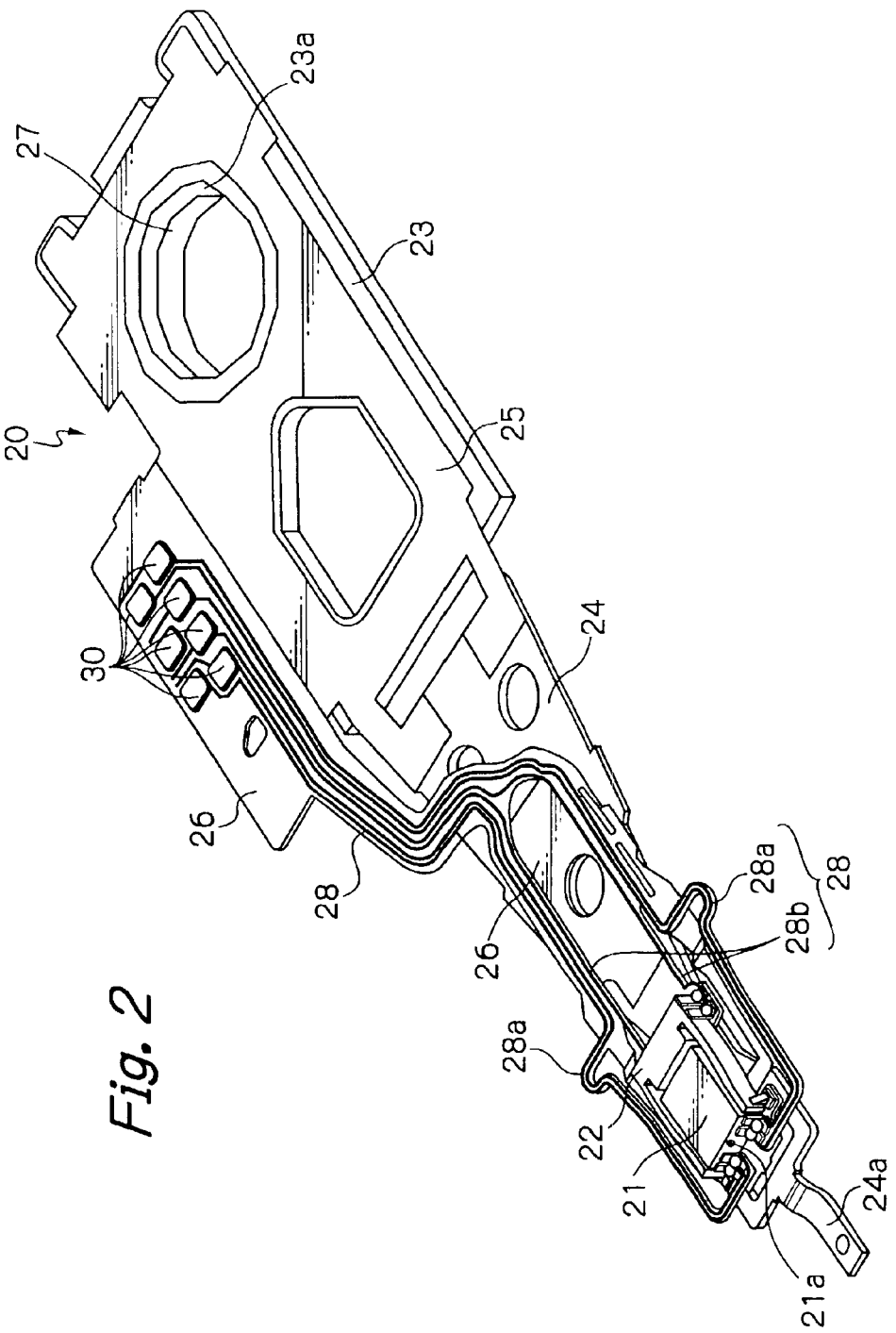
FIG. 2 is an oblique view illustrating the whole structure of an HGA in the embodiment of FIG. 1.
Figure 3:
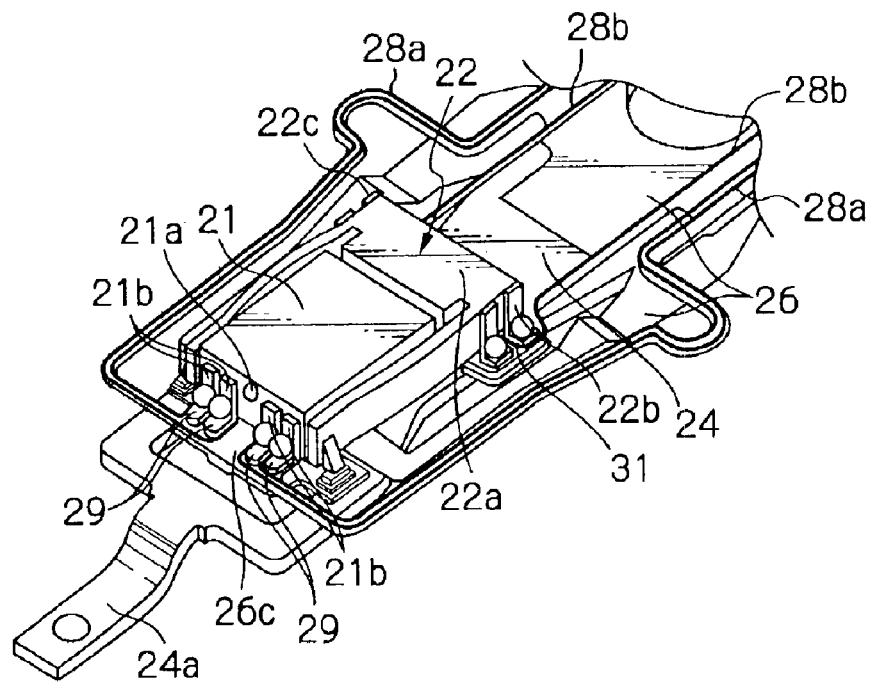
FIG. 3 is an oblique view illustrating a top end section of the HGA in the embodiment of FIG. 1.
Figure 4:
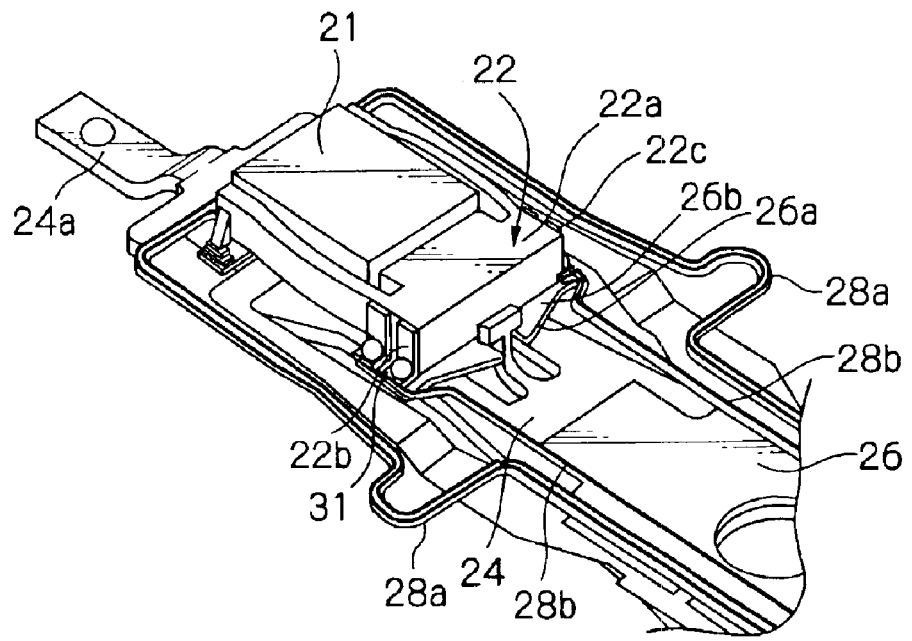
FIG. 4 is an oblique view illustrating the top end section of the HGA in the embodiment of FIG. 1, seen from different direction from that of FIG. 3.

FIG. 1 illustrates main components of a magnetic disk unit of a preferred embodiment according to the present invention, FIG. 2 illustrates the whole structure of an HGA in this embodiment, and FIGS. 3 and 4 illustrate a top end section of the HGA in this embodiment, seen from different directions with each other.

In FIG. 1, reference numeral 10 denotes a plurality of magnetic hard disks rotating around an axis 11, and 12 denotes a housing of a voice coil motor (VCM) for positioning each magnetic head element on a track of each disk. The VCM housing 12 is mainly constituted by a carriage 14 capable of rotating around an axis 13 and a main actuator 15 such as the VCM for driving the carriage 14 to swing.

Base sections at one ends of a plurality of drive arms 16 stacked along the axis 13 are attached to the carriage 14, and one or two HGAs 17 are mounted on a top section at the other end of each arm 16. Each of the HGAs 17 has a slider mounted at its top end section so that the slider opposes to one surface (recording and reproducing surface) of each of the magnetic disks 10.

As shown in FIGS. 2 to 4, the HGA is assembled by fixing a fine tracking actuator 22 for precise positioning of a thin-film magnetic head element 21a to a top end section of a suspension 20. The actuator 22 holds side surfaces of a magnetic head slider 21 with the thin-film magnetic head element 21a so that the slider 21 is caught in a space between its movable arms.

A main or course actuator of VCM 15 shown in FIG. 1 is used for rotationally swinging the drive arm 16 to which such HGA is attached, so as to move the whole assembly. The actuator 22 contributes the fine positioning of the HGA, which cannot be adjusted by the main or course actuator 15.

The suspension 20 is substantially formed, as shown in FIGS. 2 to 4, by a base plate 23, a load beam 24, a resilient hinge 25 coupled with both the base plate 23 and the load beam 24, a resilient flexure 26 fixed on the load beam 24 and the hinge 25, and a circular base plate 27 formed at an attaching section 23a of the base plate 23.

The flexure 26 has a flexible tongue 26a depressed by a dimple (not shown) formed on the load beam 24 at its one end section. On the tongue 26a, fixed is a base section 22a of the actuator 22 via an insulation layer 26b made of for example polyimide. The flexure 26 has elasticity for supporting flexibly the magnetic head slider 21 through the actuator 22 by this tongue 26a. The flexure 26 is made of in this embodiment a stainless steel plate (for example SUS304TA) with a thickness of about 25 μm. The flexure 26 is fixed with the load beam 24 and with the hinge 25 at a plurality of points by pinpoint welding.

The hinge 25 has elasticity providing, to the load beam 24, a force for pressing the magnetic head slider 21 toward the direction of a magnetic disk surface through the actuator 22 in operation. The hinge 25 is made of in this embodiment a stainless steel plate with a thickness of about 38 μm.

The base plate 23 is made of in this embodiment a stainless steel plate with a thickness of about 100 μm, and supports the whole surface of the hinge 25. The fixing of the base plate 23 with the hinge 25 is performed by pinpoint welding at a plurality of points. The load beam 24 is also made of in this embodiment a stainless steel plate with a thickness of about 100 μm, and fixed to the hinge 25 at its rear end section. The fixing of the load beam 24 with the hinge 25 is performed also by pinpoint welding at a plurality of points. At a top end of this load beam 24, formed is a lift-tab 24a for separating the HGA from the magnetic-disk surface during out of operation is prepared.

The circular base plate 27 to be attached to the drive arm 16 shown in FIG. 1 is made of in this embodiment a stainless steel or iron plate with a thickness of about 150 μm. This base plate 27 is fixed to the attaching section 23a of the base plate 23 by welding. The base plate 27 is attached to the drive arm 16 shown in FIG. 1.

On the flexure 26, a flexible conductor member 28 including a plurality of trace conductors of a thin-film multi-layered pattern is formed or disposed. The conductor member 28 is formed by a known method similar to the patterning method of forming a printed circuit board on a thin metal plate such as a flexible printed circuit (FPC). For example, the member 28 is formed by sequentially depositing a first insulation material layer made of a resin such as polyimide with a thickness of about 5–15 μm, a patterned copper (Cu) layer (trace conductor layer) with a thickness of about 4 μm, and a second insulation material layer made of a resin such as polyimide with a thickness of about 3–5 μm on the flexure 26 in this order. Within the regions of the connection pads formed for connecting with the actuator, the magnetic head element and an external circuit, a gold (Au) layer is deposited on the Cu layer and there is no second insulation material layer on the Au layer.

In this embodiment, the conductor member 28 consists of a first conductor member 28a with two trace conductors connected to the magnetic head element for one side, thus four trace conductors for both sides, and a second conductor member 28b with a trace conductor connected to the actuator 22 for one side, thus two trace conductors for both sides.

One end of the trace conductors of the first conductor member 28a is electrically connected to head element connection pads 29 formed on an individually separated and freely movable section 26c of the flexure 26. The connection pads 29 are ball-bonded to terminal electrodes 21b of the magnetic head slider 21 by Au bonding, wire bonding or stitch bonding. The other end of the trace conductors of the first conductor member 28a is electrically connected to external circuit connection pads 30 used for connection with an external circuit.

One end of trace conductors of the second conductor member 28b is electrically connected to actuator connection pads 31 formed on an insulation layer 26b on the tongue 26a of the flexure 26. The connection pads 31 are connected to A channel and B channel signal terminals 22b and 22c of the actuator 22, respectively. The other end of trace conductors of the second conductor member 28b is electrically connected to the external circuit connection pads 30.

A structure of the HGA according to the present invention is not limited to the aforementioned structure. Furthermore, although it is not shown, a head drive IC chip may be mounted on a middle of the suspension 20.

Figure 5:
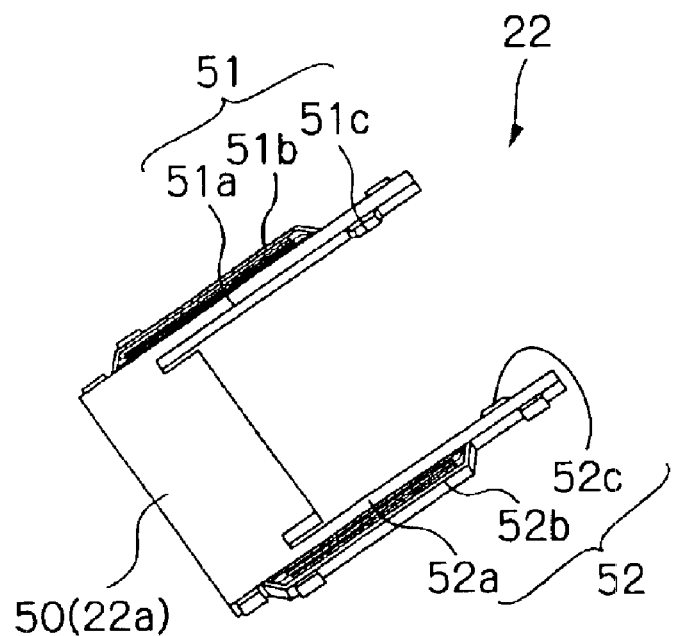
FIG. 5 is an oblique view illustrating a structure of an actuator in the embodiment of FIG. 1.
Figure 6:
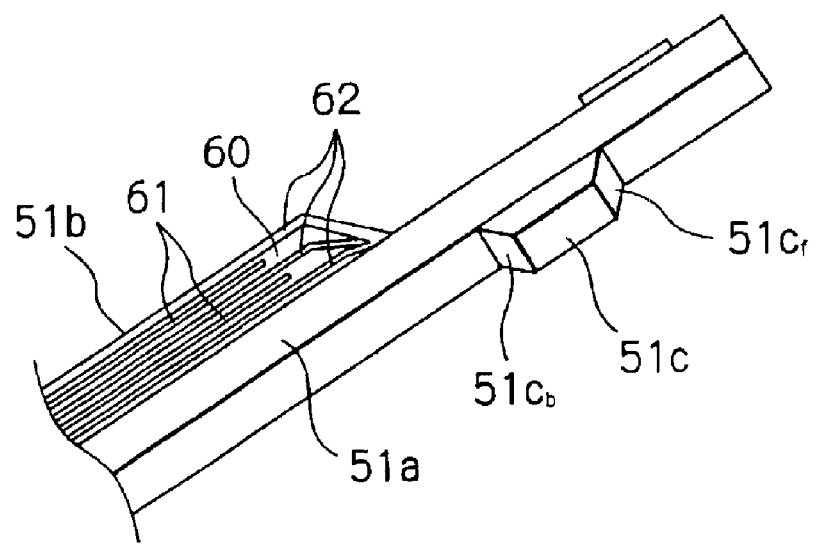
FIG. 6 is an enlarged oblique view illustrating a structure of one movable arm of the actuator shown in FIG. 5.
Figure 7:
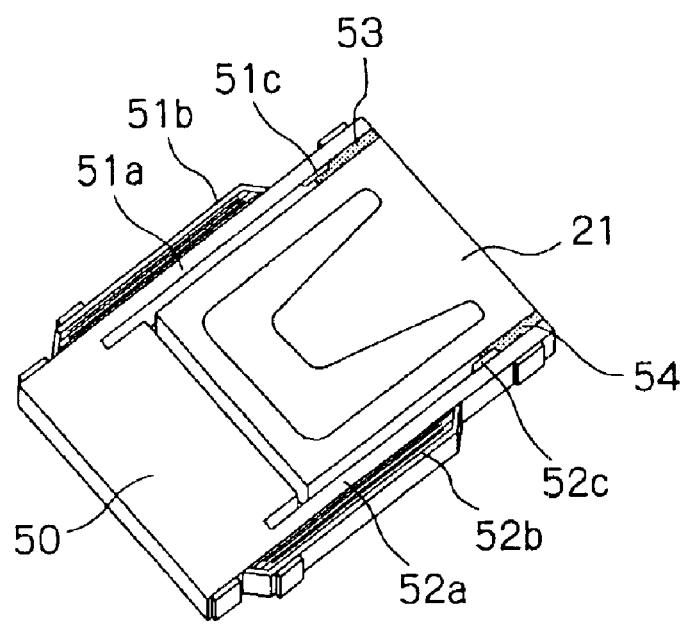
FIG. 7 is an oblique view illustrating an adhered structure of the actuator and a magnetic head slider in the embodiment of FIG. 1.
Figure 8:
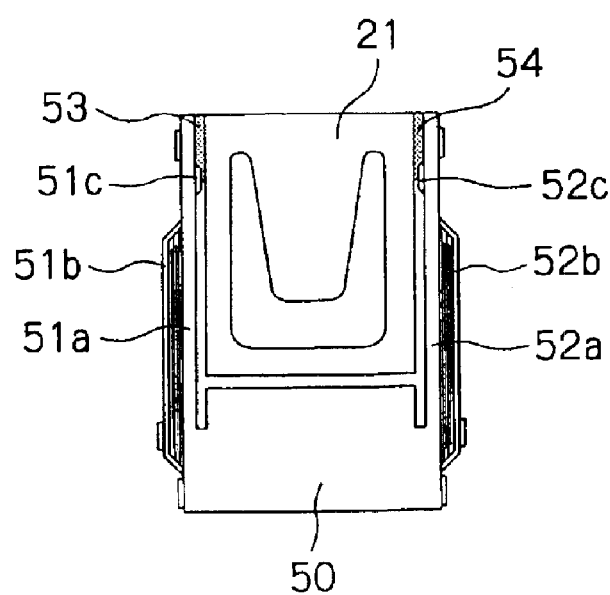
FIG. 8 is a plane view illustrating an adhered structure of the actuator and a magnetic head slider in the embodiment of FIG. 1.

FIG. 5 illustrates a structure of the actuator 22 in the embodiment of FIG. 1, FIG. 6 illustrates an enlarged structure of one movable arm of the actuator shown in FIG. 5, FIG. 7 illustrates an adhered structure of the actuator and a magnetic head slider in this embodiment, and FIG. 8 illustrates an adhered structure of the actuator and a magnetic head slider in this embodiment.

As will be noted from FIGS. 5 to 8, the actuator 22 has a rough U-plane shape and consists of a base 50 (22a) to be fixed to a suspension and a pair of movable arms 51 and 52 perpendicularly extending from both side ends of the base 50. The movable arms 51 and 52 consist of arm members 51a and 52a, piezoelectric elements 51b and 52b formed on side surfaces of the arm members 51a and 52a and protrusions 51c and 52c additionally formed on inside surfaces of the arm members 51a and 52a near their top end sections, respectively.

The base 50 and the arm members 51a and 52a of the actuator 22 are united by an elastic sintered ceramic such as $ZrO_2$ for example. Since the main sections of the actuator are made of the elastic sintered ceramic such as $ZrO_2$ that is strong for bending, a shock resistance of the actuator itself increases in comparison with an actuator made of PZT.

In this embodiment, the shape of each of the arm members 51a and 52a is flat without a level difference from its root coupled with the base 50 to its top end so as to have substantially the same cross section.

The protrusions 51c and 52c are formed by screen-printing a thick-film printing material such as a metal material or a sintered ceramic material on the inside surfaces of the arm members 51a and 52a, and by sintering them in the same sintering process of the base and the arm members. Each of the protrusions 51c and 52c has in this embodiment tapered flat surfaces ($51c_f$ and $51c_b$) at its front and back ends (top and back ends). The metal material used for the protrusions may be platinum (Pt), palladium (Pd), nickel palladium (PdNi) or gold (Au) for example. The sintered ceramic material used for the protrusions may be $ZrO_2$ for example which is the same as the arm member.

The magnetic head slider 21 is caught between the top end sections of these flat arm members 51a and 52a, and the side surfaces of the slider 21 are adhered to the inside surfaces of the arm members 51a and 52a using adhesives (i.e., bonding material) 53 and 54 of a liquid adhesive such as an epoxy adhesive. The adhesives 53 and 54 are potted on the arm members 51a and 52a at the protrusions (i.e., bonding material stoppers) 51c and 52c and within regions between the protrusions and the top end of the arm members 51a and 52a as shown in FIGS. 7 and 8. As for the adhesives 53 and 54, an adhesive film such as an anisotropic conductive film (ACF) may be used instead of the liquid adhesive. If the adhesive film is used for adhering (i.e., bonding) the magnetic head slider to the arm members, the adhesion process can be performed very easily and thus a required time for the adhesion process can be greatly shortened.

A thickness of the actuator 22 is determined to a value equal to or thinner than that of the magnetic head slider to be held so that the total thickness of the HGA will not increase due to the mounting of the actuator. Conversely, by thickening the actuator 32 up to the thickness of the magnetic head slider to be held, strength of the actuator itself can be increased without increasing the total thickness of the HGA.

Each of the piezoelectric elements 51b and 52b has, as shown in FIG. 6, a multi-layered structure of alternately laminating piezoelectric material layers 60, signal electrode layers 61 and ground (common) electrode layers 62. By applying voltage across the signal electrode layers 61 and the ground (common) layers 62, the piezoelectric material layers 60 expand and contract. The piezoelectric material layer 60 is made of material that expands and contracts by reverse piezoelectric effect or by electrostrictive effect. The signal electrode layers 61 are electrically connected to the A channel signal terminal 22b or the B channel signal terminal 22c, and the ground (common) electrode layers 62 are electrically connected to ground connection pads via ground terminals, shown in FIGS. 3 and 4.

In case that the layers 60 are made of piezoelectric material such as PZT (Lead Zirconate Titanate Oxidization), these piezoelectric material layers are in general polarized so as to improve their displacement performance. The polarized direction is the lamination direction of the piezoelectric material layers 60. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 51b or 52b, the piezoelectric element contracts or expands in response to the applied voltage polarity and thus the movable arm 51 or 52 bends to trace a S-character resulting the top end section of the arm 51 or 52 to laterally and linearly displace. Thus, the magnetic head slider 21 fixed with the actuator 22 also laterally and linearly displaces. Since the slider displaces namely oscillates with linear motion not swinging or rotational motion, more precise positioning of the magnetic head element can be expected.

It is possible to apply voltages that induce mutually reverse motions may be simultaneously applied to the piezoelectric elements 51b and 52b, respectively. In other words, AC voltages may be simultaneously applied to the piezoelectric elements 51b and 52b so that one piezoelectric element expands when the other piezoelectric element contracts and vice versa. The oscillation of the movable arms is centered when no voltage is applied to the piezoelectric elements.

However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate ($BaTiO_3$).

As aforementioned, since the actuator 22 in this embodiment has the arm members 51a and 52a of the movable arms 51 and 52 shaped in flat with no level difference and the protrusions 51c and 52c with the tapered surfaces, additionally formed on inside surfaces of the arm members 51a and 52a near their top end sections, stress will not converge on specific portions of the arm members when an impactive force is applied to the HGA. Thus, shock resistance of the actuator and also of the HGA can be remarkably improved.

In fact, shock tests for repeatedly applying an impactive force of 800 G for 0.5 seconds to an adhered structure of the actuator described in Japanese patent publication 2002074870A with a magnetic head slider and to an adhered structure of the actuator of the embodiment shown in FIGS. 7 and 8 with a magnetic head slider were performed. The arm members of both the actuators have the same length of about 1.9 mm, the same height of about 0.25 mm and the same thickness of about 0.05 mm. The arm member of the structure described in Japanese patent publication 2002074870A itself is inwardly projected at its top end section by about 0.05 mm. Whereas each of the protrusions 51c and 52c of the structure in the embodiment has a height of about 0.012 mm, a bottom length of about 0.1 mm and an angle of the taper surface with respect to the bottom surface of about 60 degrees. As a result, a breakdown of the actuator according to the structure described in Japanese patent publication 2002074870A occurred when the application of the impactive force was repeated by one or two times, whereas a breakdown of the actuator according to this embodiment occurred only when application of the impactive force was repeated by fourteen or fifteen times.

Also, according to the embodiment, since a thickness and an adhering region of each of the adhesive (i.e., bonding material) 53 and 54 is defined by each protrusion (i.e., bonding material stopper) 51c or 52c, the amount of the adhesive potted on the actuators can be uniformly controlled. Therefore, it is possible to obtain a stable and reliable adhesion force resulting an extremely stable stroke characteristics and an extremely stable resonance characteristics of the actuator.

Figure 9:
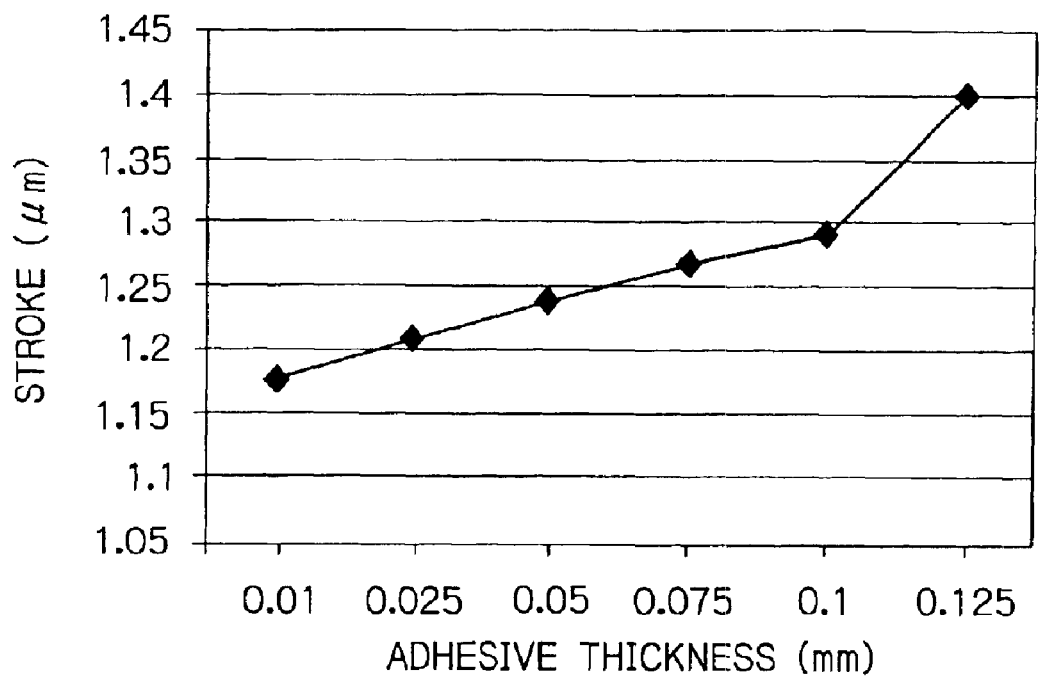
FIG. 9 is a graph illustrating a simulation result of a stroke characteristics of an actuator with respect to a thickness of an adhesive.
Figure 10:
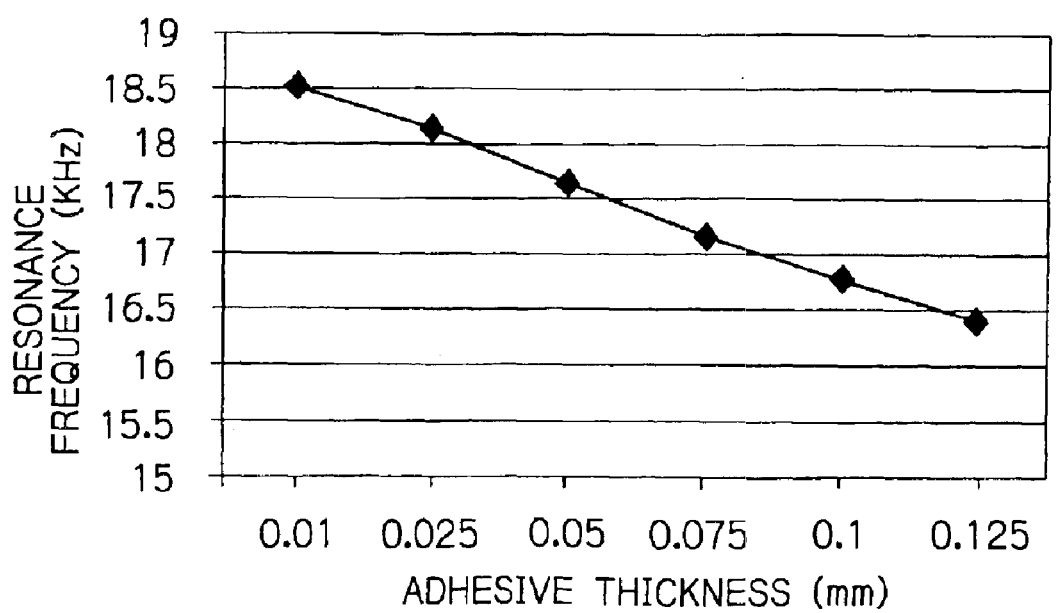
FIG. 10 is a graph illustrating a simulation result of a resonance frequency characteristics of the actuator with respect to a thickness of the adhesive.

FIGS. 9 and 10 illustrate simulation results of a stroke characteristics of an actuator with respect to a thickness of an adhesive, and of a resonance frequency characteristics of the actuator with respect to a thickness of the adhesive. As will be noted from these figures, the stroke of the actuator increases with increase in thickness of the adhesive and the resonance frequency lowers with increase in the adhesive thickness. Thus, if the thickness of the adhesives 53 and 54 is properly controlled by the protrusions 51c and 52c, desired stroke characteristics and resonance frequency characteristics can be obtained.

Figure 11:
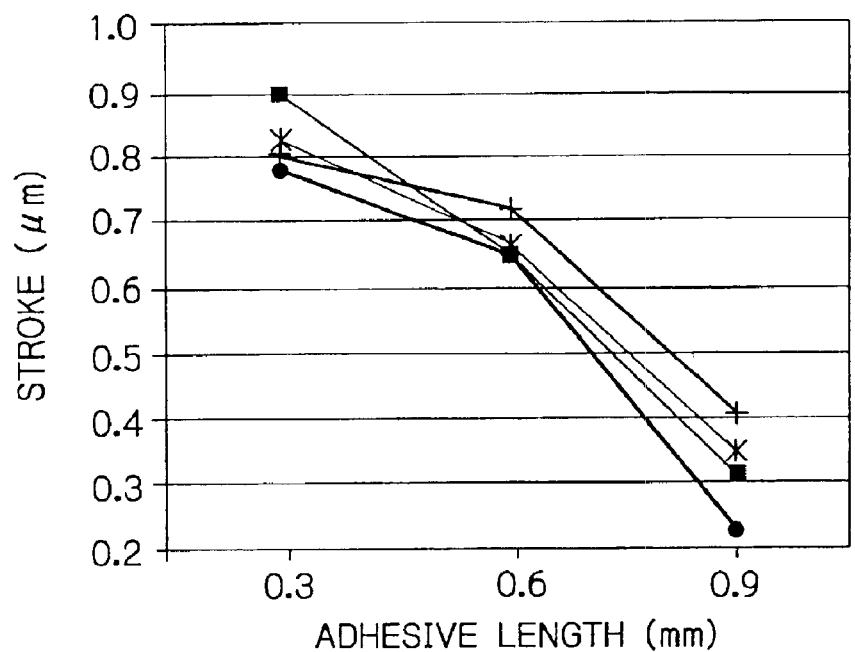
FIG. 11 is a graph illustrating a simulation result of a stroke characteristics of an actuator with respect to a length of the adhesive.
Figure 12:
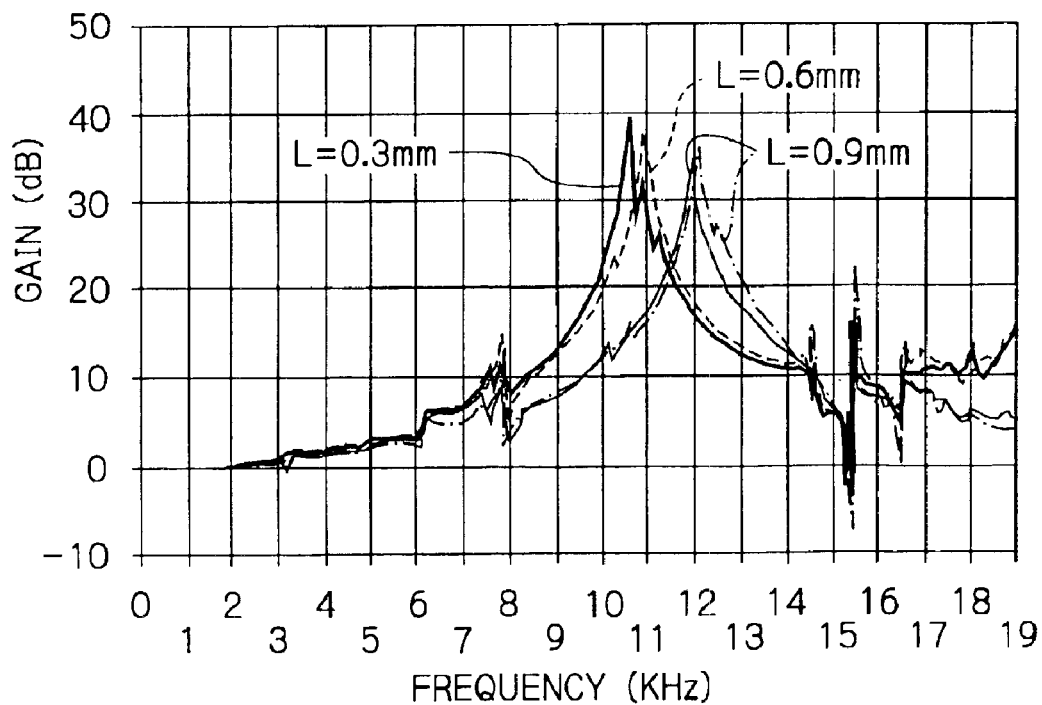
FIG. 12 is a graph illustrating a simulation result of a resonance frequency characteristics of the actuator when the length of the adhesive is changed as a parameter.

FIG. 11 illustrates a simulation result of a stroke characteristics of an actuator with respect to a length L of the adhesive along the axial direction of the movable arm, and FIG. 12 illustrates a simulation result of a resonance frequency characteristics of the actuator when the length L of the adhesive is changed as a parameter. As will be noted from these figures, the stroke of the actuator decreases with increase in the length L of the adhesive and the resonance frequency increases with increase in the adhesive length L. Thus, if the length of the adhesives 53 and 54, namely the length of the adhering regions is properly controlled by the protrusions 51c and 52c, desired stroke characteristics and resonance frequency characteristics can be obtained.

Also, since the actuator 22 in this embodiment holds the side surfaces of the magnetic head slider 21 so that the slider 21 is caught in a space between the movable arms 51 and 52, the thickness of the HGA around the magnetic head slider does not increase even if the actuator 22 is attached. Thus, no modifications in size of the magnetic disk drive apparatus due to the mounting of the actuator is necessary.

Furthermore, since the actuator 22 and the magnetic head slider 21 are not stacked to form a cantilever structure, a shock resistance can be greatly improved. In addition, since the magnetic head slider 21 is caught in between the movable arms 51 and 52, the top end sections of the movable arms 51 and 52, which actually transfer the displacement to the slider 21, can be always positioned at the top end of the slider 21. Thus, it is possible to provide a constant travel to the slider even if the size of the magnetic head slider 21 changes, and therefore an enough stroke of the magnetic head at the precise positioning operation can be always obtained.

Figure 13:
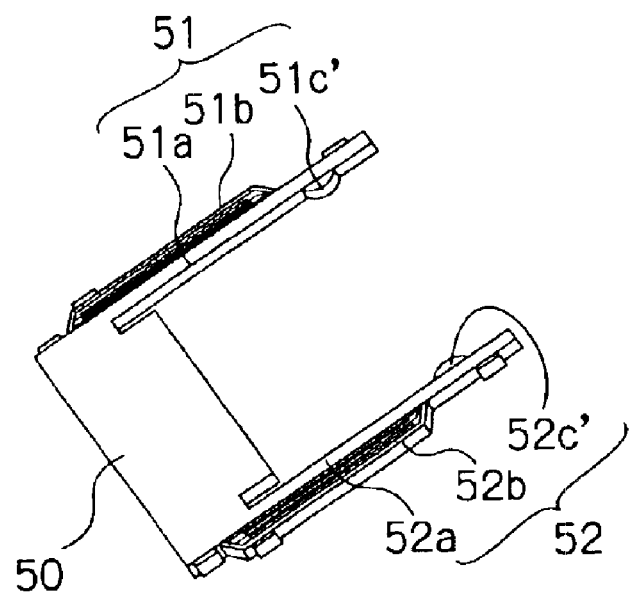
FIG. 13 is an oblique view illustrating a structure of an actuator in another embodiment according to the present invention.
Figure 14:
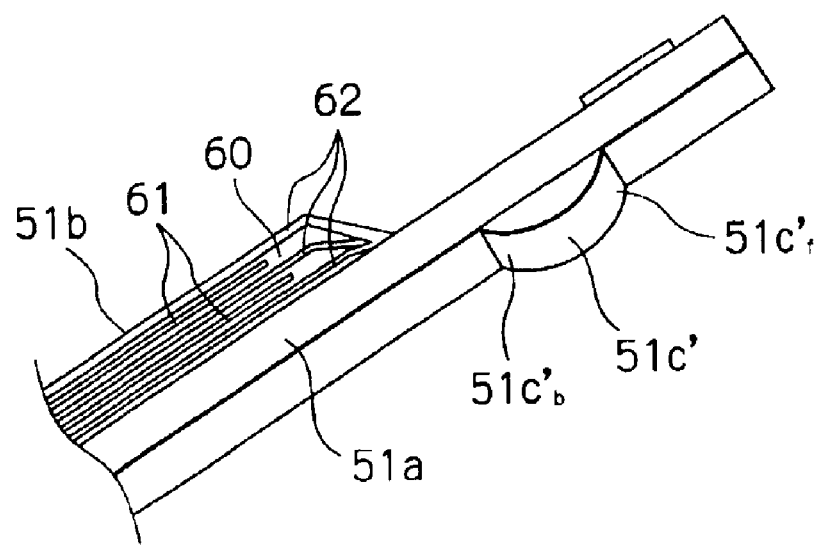
FIG. 14 is an enlarged oblique view illustrating a structure of one movable arm of the actuator shown in FIG. 13.
Figure 15:
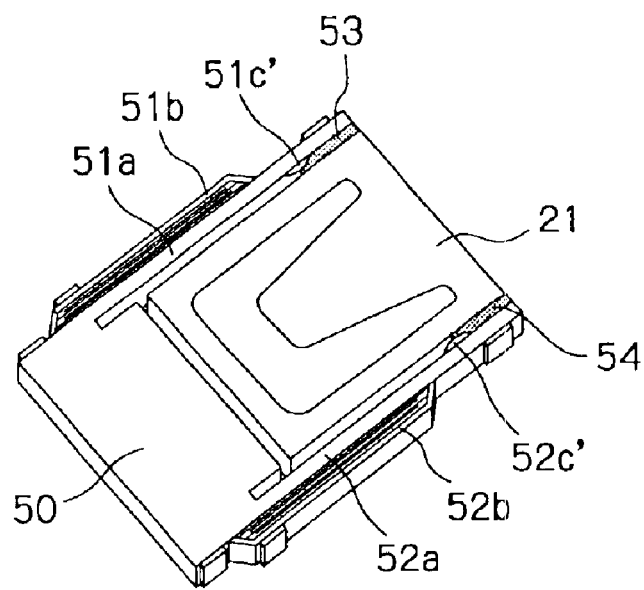
FIG. 15 is an oblique view illustrating an adhered structure of the actuator and a magnetic head slider in the embodiment of FIG. 13.
Figure 16:
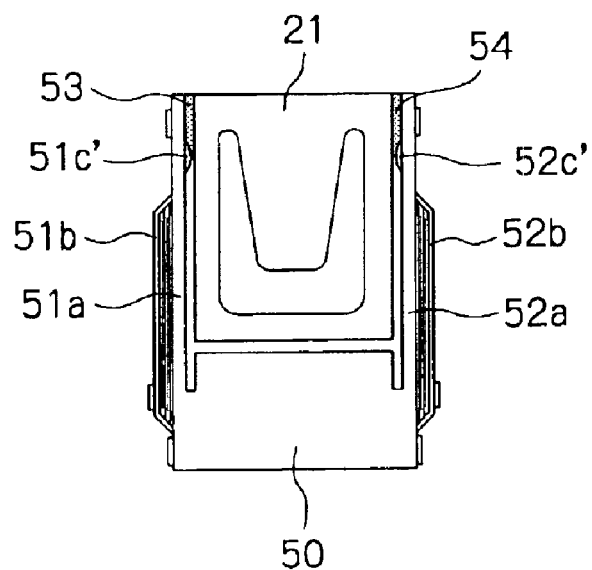
FIG. 16 is a plane view illustrating an adhered structure of the actuator and a magnetic head slider in the embodiment of FIG. 13.

FIG. 13 illustrates a structure of the actuator in another embodiment according to the present invention, FIG. 14 illustrates an enlarged structure of one movable arm of the actuator shown in FIG. 13, FIG. 15 illustrates an adhered structure of the actuator and a magnetic head slider in this embodiment, and FIG. 16 illustrates an adhered structure of the actuator and a magnetic head slider in this embodiment.

A magnetic disk apparatus and HGA in this embodiment has the similar configurations, operations and advantages as those of the embodiment of FIG. 1 except that a taper surface shape in protrusions of an actuator differs from that of the embodiment of FIG. 1. Thus, in FIGS. 13 to 16, elements similar to those in the embodiment of FIG. 1 have the same reference numerals.

As clearly shown in FIG. 14, the actuator in this embodiment differs from the actuator in the embodiment of FIG. 1 in that each of protrusions 51c' and 52c' has tapered curved surfaces ($51c_f$ and $51c_b$) with an arc shaped section at its front and back ends (top and back ends).

Figure 17:
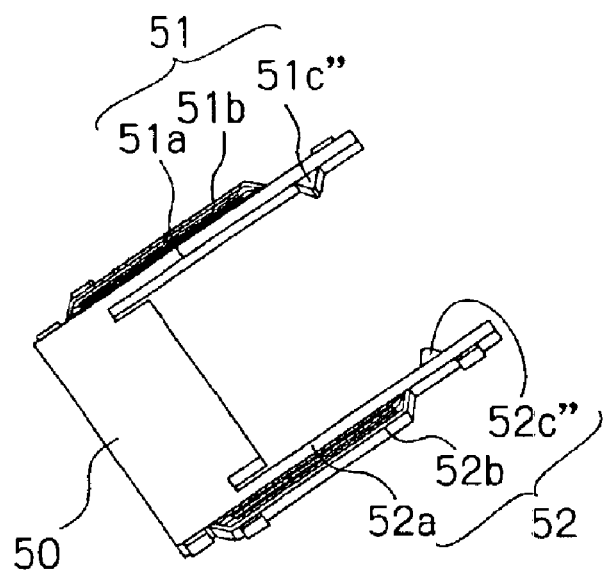
FIG. 17 is an oblique view illustrating a structure of an actuator in a further embodiment according to the present invention.
Figure 18:
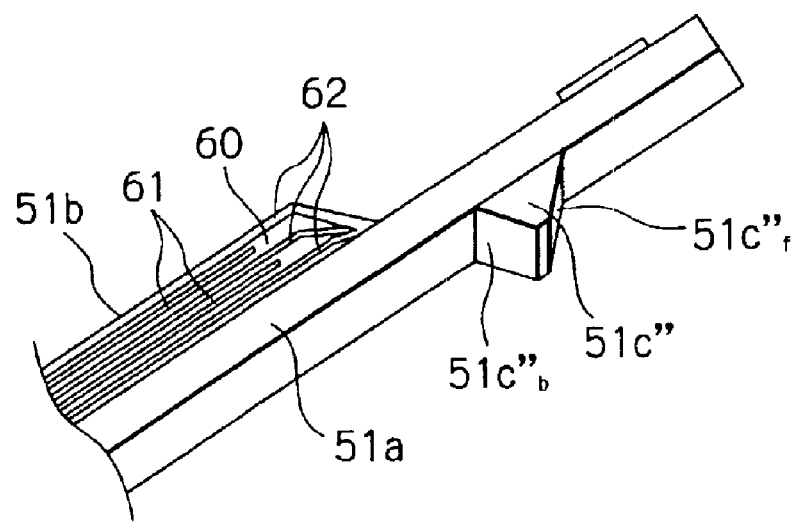
FIG. 18 is an enlarged oblique view illustrating a structure of one movable arm of the actuator shown in FIG. 17.
Figure 19:
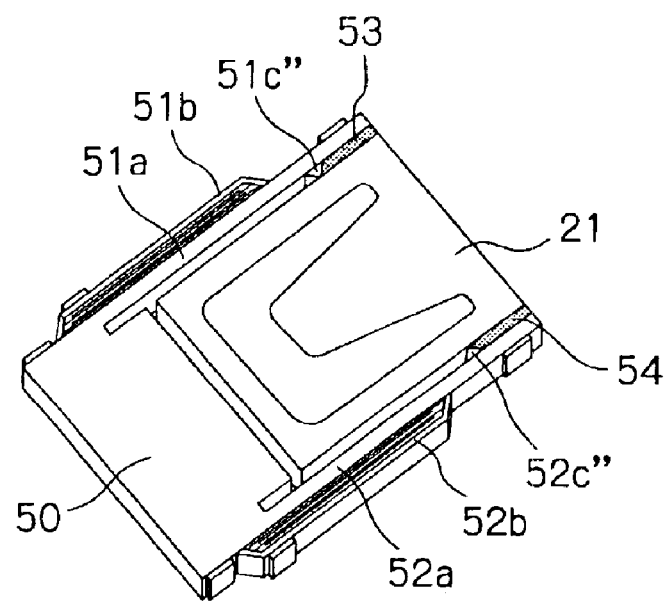
FIG. 19 is an oblique view illustrating an adhered structure of the actuator and a magnetic head slider in the embodiment of FIG. 17.
Figure 20:
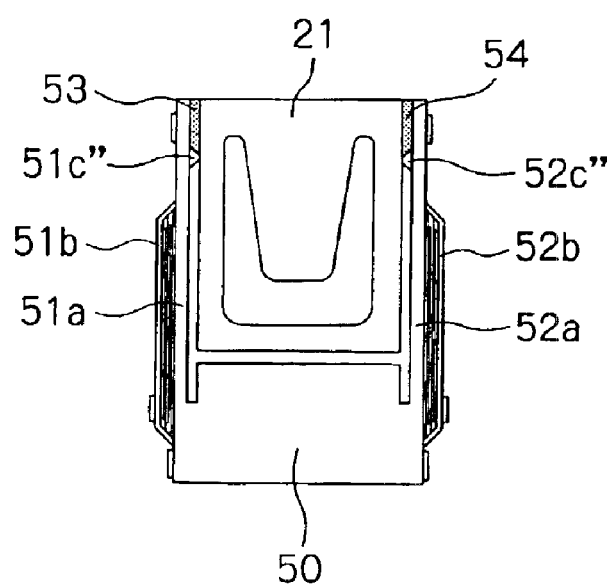
FIG. 20 is a plane view illustrating an adhered structure of the actuator and a magnetic head slider in the embodiment of FIG. 17.

FIG. 17 illustrates a structure of the actuator in a further embodiment according to the present invention, FIG. 18 illustrates an enlarged structure of one movable arm of the actuator shown in FIG. 17, FIG. 19 illustrates an adhered structure of the actuator and a magnetic head slider in this embodiment, and FIG. 20 illustrates an adhered structure of the actuator and a magnetic head slider in this embodiment.

A magnetic disk apparatus and HGA in this embodiment has the similar configurations, operations and advantages as those of the embodiment of FIG. 1 except that a shape of protrusions of an actuator differs from that of the embodiment of FIG. 1. Thus, in FIGS. 17 to 20, elements similar to those in the embodiment of FIG. 1 have the same reference numerals.

As clearly shown in FIG. 18, the actuator in this embodiment differs from the actuator in the embodiment of FIG. 1 in that each of protrusions 51c" and 52c" has a top surface with a smaller area and substantially consists of tapered flat surfaces ($51c_f'$ and $51c_b'$) at its front and back ends (top and back ends) to form approximately a triangular prism shape.

A shape of the taper surface of each protrusion of the actuator according to the present invention is not limited to the aforementioned shape but various shape can be adopted.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A precise positioning actuator provided with a base and a pair of movable arms capable of displacing in response to a drive signal applied to said actuator, said pair of movable arms extending from said base for holding a head slider with at least one head element in a space between said pair of movable arms, for precisely positioning said at least one head element,
- each of said pair of movable arms including an arm member being made of an elastic sintered ceramic and having substantially the same cross sectional shape from a root thereof to a top end thereof, a piezoelectric element formed on a side surface of said arm member and a bonding material stopper additionally formed on an inside surface of said arm member near its top end section, said bonding material stopper having tapered surfaces,
- side surfaces of said head slider being adhered to the inside surfaces of said arm members at said bonding material stopper and within regions between said bonding material stopper and top ends of said arm members.

2. The actuator as claimed in claim 1, wherein said base is made of an elastic sintered ceramic, and wherein said bonding material stopper is made of a thick-film printing material of metal material or ceramic material.

3. The actuator as claimed in claim 2, wherein said elastic sintered ceramic is zirconium oxide.

4. The actuator as claimed in claim 2, wherein said thick-film printing material is a sintered ceramic material.

5. The actuator as claimed in claim 1, wherein said tapered surfaces of each bonding material stopper are located at front and back ends of said bonding material stopper, respectively.

6. The actuator as claimed in claim 5, wherein said tapered surfaces of each bonding material stopper have flat surfaces.

7. The actuator as claimed in claim 5, wherein said tapered surfaces of each bonding material stopper have curved surfaces.

8. The actuator as claimed in claim 1, wherein said actuator has a rough U-plane shape.

9. A head gimbal assembly provided with a head slider with at least one head element, a precise positioning actuator supporting said head slider for precisely positioning said at least one head element and a support fixed with said precise positioning actuator,
- said precise positioning actuator including a base fixed to said support and a pair of movable arms capable of displacing in response to a drive signal applied to said actuator, said pair of movable arms extending from said base for holding said head slider in a space between said pair of movable arms,
- each of said pair of movable arms including an arm member being made of an elastic sintered ceramic and having substantially the same cross sectional shape from a root thereof to a top end thereof, a piezoelectric element formed on a side surface of said arm member and a bonding material stopper additionally formed on an inside surface of said arm member near its top end section, said bonding material stopper having tapered surfaces,
- side surfaces of said head slider being adhered to the inside surfaces of said arm members at said bonding material stopper and within regions between said bonding material stopper and top ends of said arm members.

10. The head gimbal assembly as claimed in claim 9, wherein said base of said actuator is made of an elastic sintered ceramic, and wherein said bonding material stopper of said actuator is made of a thick-film printing material of metal material or ceramic material.

11. The head gimbal assembly as claimed in claim 10, wherein said elastic sintered ceramic is zirconium oxide.

12. The head gimbal assembly as claimed in claim 10, wherein said thick-film printing material is a sintered ceramic material.

13. The head gimbal assembly as claimed in claim 9, wherein said tapered surfaces of each bonding material stopper of said actuator are located at front and back ends of said bonding material stopper, respectively.

14. The head gimbal assembly as claimed in claim 13, wherein said tapered surfaces of each bonding material stopper have flat surfaces.

15. The head gimbal assembly as claimed in claim 13, wherein said tapered surfaces of each bonding material stopper have curved surfaces.

16. The head gimbal assembly as claimed in claim 9, wherein said actuator has a rough U-plane shape.

17. The head gimbal assembly as claimed in claim 9, wherein the side surfaces of said head slider and the inside surfaces of said arm members are adhered with each other by a liquid adhesive.

18. The head gimbal assembly as claimed in claim 9, wherein said at least one head element is at least one thin-film magnetic head element.

19. The head gimbal assembly as claimed in claim 9, wherein said at least one head element is at least one optical head element.

20. A disk drive apparatus having at least one head gimbal assembly that includes a head slider with at least one head element, a precise positioning actuator supporting said head slider for precisely positioning said at least one head element and a support fixed with said precise positioning actuator,
- said precise positioning actuator including a base fixed to said support and a pair of movable arms capable of displacing in response to a drive signal applied to said actuator, said pair of movable arms extending from said base for holding said head slider in a space between said pair of movable arms,
- each of said pair of movable arms including an arm member being made of an elastic sintered ceramic and having substantially the same cross sectional shape from a root thereof to a top end thereof, a piezoelectric element formed on a side surface of said arm member and a bonding material stopper additionally formed on an inside surface of said arm member near its top end section, said bonding material stopper having tapered surfaces,
- side surfaces of said head slider being adhered to the inside surfaces of said arm members at said bonding material stopper and within regions between said bonding material stopper and top ends of said arm members.

21. The disk drive apparatus as claimed in claim 20, wherein said base of said actuator is made of an elastic sintered ceramic, and wherein said bonding material stopper of said actuator is made of a thick-film printing material of metal material or ceramic material.

22. The disk drive apparatus as claimed in claim 21, wherein said elastic sintered ceramic is zirconium oxide.

23. The disk drive apparatus as claimed in claim 21, wherein said thick-film printing material is a sintered ceramic material.

24. The disk drive apparatus as claimed in claim 20, wherein said tapered surfaces of each bonding material stopper of said actuator are located at front and back ends of said bonding material stopper, respectively.

25. The disk drive apparatus as claimed in claim 24, wherein said tapered surfaces of each bonding material stopper have flat surfaces.

26. The disk drive apparatus as claimed in claim 24, wherein said tapered surfaces of each bonding material stopper have curved surfaces.

27. The disk drive apparatus as claimed in claim 20, wherein said actuator has a rough U-plane shape.

28. The disk drive apparatus as claimed in claim 20, wherein the side surfaces of said head slider and the inside surfaces of said arm members are adhered with each other by a liquid adhesive.

29. The disk drive apparatus as claimed in claim 20, wherein said at least one head element is at least one thin-film magnetic head element.

30. The disk drive apparatus as claimed in claim 20, wherein said at least one head element is at least one optical head element.

* * * * *

UNITED STATES PATENT AND TRADEMARK OFFICE
CERTIFICATE OF CORRECTION

PATENT NO. : 6,934,127 B2
DATED : August 23, 2005
INVENTOR(S) : Ming Gao Yao et al.

It is certified that error appears in the above-identified patent and that said Letters Patent is hereby corrected as shown below:

Title page,
Item [73], Assignee, change "Sae" to -- SAE --.

Signed and Sealed this

Twenty-first Day of February, 2006

JON W. DUDAS
*Director of the United States Patent and Trademark Office*